United States Patent [19]

Püntener

[11] 4,443,370
[45] Apr. 17, 1984

[54] CHROME-COMPLEX DYES

[75] Inventor: Alois Püntener, Rheinfelden, Switzerland

[73] Assignee: Ciba-Geigy Corporation, Ardsley, N.Y.

[21] Appl. No.: 267,311

[22] Filed: May 28, 1981

[30] Foreign Application Priority Data

Jun. 5, 1980 [CH] Switzerland .................. 4345/80

[51] Int. Cl.$^3$ ............................................. C09B 45/00
[52] U.S. Cl. ..................................... 260/145 B; 8/686
[58] Field of Search ..................................... 260/145 B

[56] References Cited

U.S. PATENT DOCUMENTS 2,855,393 10/1958 Schetty et al. .................. 260/145 B
2,985,646 5/1961 Schetty et al. ...................... 260/145

FOREIGN PATENT DOCUMENTS 2542707 9/1975 Fed. Rep. of Germany.
2723155 11/1978 Fed. Rep. of Germany.
2735287 3/1979 Fed. Rep. of Germany.
1197265 7/1970 United Kingdom.
1387976 3/1975 United Kingdom.
1513534 6/1978 United Kingdom.

*Primary Examiner*—Helen M. S. Sneed
*Attorney, Agent, or Firm*—Edward McC. Roberts

[57] ABSTRACT

Chrome-complex dyes of the formula (I)

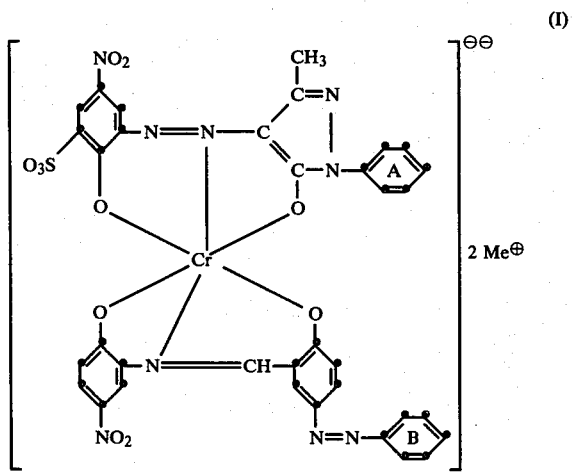

wherein the phenyl groups A and B independently of one another are each unsubstituted or are mono- or disubstituted by chlorine, methyl, ethyl, methoxy or ethoxy, and wherein Me$^\oplus$ is a cation.

The dyes are suitable for dyeing nitrogen-containing materials, particularly for dyeing wool in orange shades.

4 Claims, No Drawings

CHROME-COMPLEX DYES

The present invention relates to novel chrome-complex dyes of the formula (I)

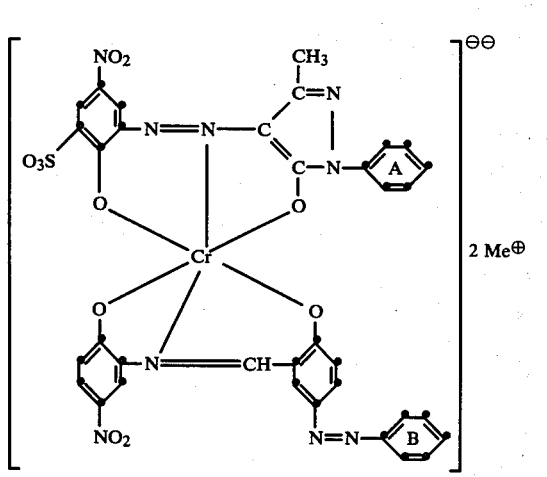

wherein the phenyl groups A and B independently of one another are each unsubstituted or mono- or disubstituted by chlorine, methyl, ethyl, methoxy and ethoxy, and wherein Me$^\oplus$ is a cation.

The cation Me$^\oplus$ is for example an ammonium or alkali metal cation, such as the potassium cation, preferably however a lithium or sodium cation.

Preferably, the phenyl groups A and B together carry no more than two of the substituents mentioned, and of particular interest on account of its good dyeing properties and its easy availability is the dye of the above formula (I) wherein the phenyl groups A and B are unsubstituted.

The novel dyes are produced by reacting for example, in a manner known per se, an azo dye of the formula (II)

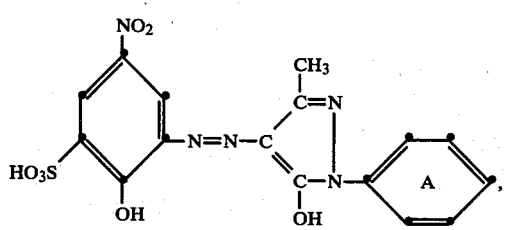

or an azomethine-azo dye of the formula (III)

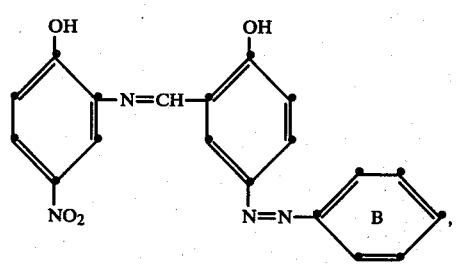

with a chromium-releasing agent to give the 1:1-chrome complex, and subsequently reacting this with the unmetallised dye of the formula (III) or (II) to obtain the 1:2-chrome complex.

Preferably, however, the 1:1-chrome complex of the monoazo dye of the formula (II) is firstly produced, and this is then reacted with a mixture of the aminophenol of the formula (IV)

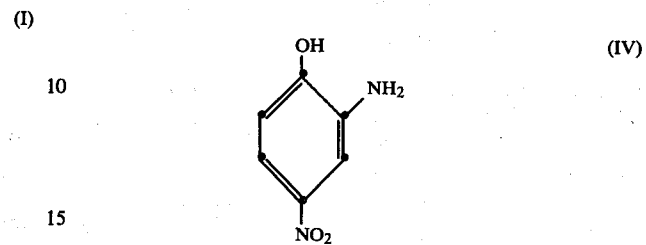

and an azo dye of the formula (V)

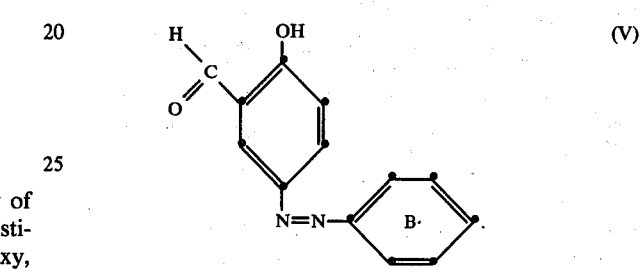

Instead of containing hydroxyl groups, the starting compounds of the formula II can contain in the diazo component also groups from which the hydroxyl group is formed in the reaction with chromium, for example low-molecular acyloxy or alkoxy groups, particularly the methoxy group.

The conversion of the azo dye of the formula (II) or of the azomethine-azo dye of the formula (III) into the 1:1-chrome complex is performed by customary methods known per se, for example by performing the reaction in an acid medium with a salt of trivalent chromium, such as chromium formiate, chromium sulfate, chromium chloride hexahydrate of chromium fluoride, at boiling temperature or at temperatures exceeding 100° C., optionally under pressure, the acid medium being an aqueous solution or one of the organic solvents given below. Trivalent chromium can also be produced in the reaction mixture from chromium-VI compounds, for example chromate, when simultaneously a reducing agent is added.

The reaction of the 1:1-chrome complex of the dye of the formulae (II) and (III) with a dye of the formulae (III) and (II), respectively, is performed advantageously in a weakly acid, neutral or weakly alkaline medium, in an open or closed vessel, at elevated temperature, for example at temperatures between 50° and 120° C. The reaction can be carried out in organic solvents, for example in alcohols or ketones, or in an aqueous solution, whereby then an addition of a solvent, for example an alcohol, formamide, and so forth, can if necessary accelerate the reaction. It is also possible to add auxiliaries, such as tensides, antifoam agents, complexing agents or amines, such as triethanolamine, which facilitate the addition reaction and prevent the formation of by-products. Impurities difficultly soluble in water can be advantageously rinsed out with organic solvents. It is advisable in general to react with each other as far as possible equivalent amounts of the chromium-containing 1:1-complex and of the metal-free dye, the molar ratio between metal-free dye and 1:1-complex preferably being at least 0.85:1 and at most 1:0.85. An excess of 1:1-complex is generally more advantageous than an excess of metal-free dye.

The reaction of the 1:1-chrome complex of the dye of the formula (II) with a mixture of the aminophenol of the formula (IV) and the aldehyde of the formula (V) is likewise performed by methods known per se, preferably in an alkaline to weakly acid medium, the aminophenol and azo dye preferably being used in equimolecular amounts. The temperature is preferably between 60° and 100° C., especially about 80° C.

The monoazo compounds of the formula (II) or their alkoxy derivatives can be produced in the customary manner by coupling a 1-hydroxy- or 1-alkoxy-2-amino-4-nitrobenzene-6-sulfonic acid to 1-phenyl-3-methylpyrazol-5-one or to the compound substituted as stated above in the phenyl ring.

Suitable coupling components are for example:
1-phenyl-3-methylpyrazol-5-one,
1-(2'-, 3'- or 4'-chlorophenyl)-3-methylpyrazol-5-one,
1-(2'-, 3'- or 4'-methylphenyl)-3-methylpyrazol-5-one,
1-(2'-, 3'- or 4'-ethylphenyl)-3-methylpyrazol-5-one
1-(2'-, 3'- or 4'-methoxyphenyl)-3-methylpyrazol-5-one,
1-(2'-, 3'- or 4'-ethoxyphenyl)-3-methylpyrazol-5-one,
1-(2'-, 5'- or 3'-, 4'-dichlorophenyl)-3-methylpyrazol-5-one.

The azo dyes of the formula (V) are produced in the customary manner by diazotising an unsubstituted or substituted aniline, and coupling the diazotised product to salicylaldehyde. Suitable anilines are for example: aniline, 2-, 3- or 4-chloroaniline, 2-, 3- or 4-methylaniline, 2-, 3- or 4-ethylaniline, 2-, 3- or 4-methoxyaniline, 2-, 3- or 4-ethoxyaniline, 2,3- or 2,4- or 2,5-or 2,6- or 3,4- or 3,5-dichloroaniline, 2,4- or 2,5-dimethoxyaniline, 2-chloro-5-methoxyaniline or 3-chloro-2-methoxyaniline.

The azo dyes of the formula (V) are converted, in a known manner, by reaction with the aminophenol of the formula (IV) into an azomethine-azo dye, this reaction being preferably performed, as described above, in the presence of the 1:1-chrome complex of the dye of the formula (II), so that there is immediately obtained, in a "single-vessel reaction", the 1:2-chrome complex of the above formula I.

In producing the 1:2-chrome-complex dyes according to the invention, it is also possible to use mixtures of various azo dyes of the formula II and/or mixtures of various azomethine-azo dyes of the formula III. Mixtures containing various 1:2-chrome-complex dyes of the formula I are obtained in these cases.

The novel 1:2-chrome complexes obtainable by the above processes are advantageously isolated in the form of their salts, especially alkali metal salts, in particular sodium or lithium salts, or ammonium salts, or salts of organic amines having a positively charged nitrogen atom, and they are suitable for dyeing and printing various materials, particularly however for dyeing nitrogen-containing materials, such as silk, leather and especially wool, as well as synthetic fibres formed from polyamides or polyurethanes. They are above all suitable for dyeing from a weakly alkaline, neutral or weakly acid bath, for example acetic acid bath. The dyeings thus obtained are level and have good fastness to light, washing, water, hot water, milling, decatising and carbonising.

The 1:2-chrome complexes in the form of organic amine salts, which are soluble in organic solvents, can be used for dyeing, by customary methods, spinning solutions, polymeric solutions, resins, lacquers, wood-mordants, varnishes, leather by the spraying process, writing inks, organic liquids and anodically oxidised aluminium.

Except where otherwise stated, the term 'parts' denotes parts by weight, percentages are percent by weight and temperatures are given in degrees Centigrade in the Examples which follow.

EXAMPLE 1

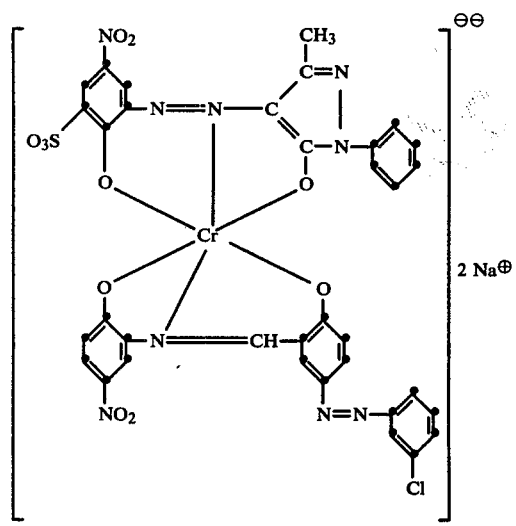

To 500 parts of water are added successively (a) the comples 1:1-chromium compound containing 41.9 parts of the dye formed from diazotised 4-nitro-2-aminophenol-6-sulfonic acid and 1-phenyl-3-methyl-5-pyrazolone as well as 5.2 parts of chromium, (b) 15.4 parts of 4-nitro-2-aminophenol and (c) 26.1 parts of the monoazo dye formed from diazotised 3-chloroaniline and salicylaldehyde. Until the formation of the 1:2-complex dye is completed, the reaction mixture is maintained, with stirring, at pH 5–9 and at 80° C. 50 parts of sodium chloride are subsequently added at room temperature, and the dye is filtered off and then dried. It dyes wool, polyamide and leather in an orange shade having good fastness properties.

EXAMPLE 2

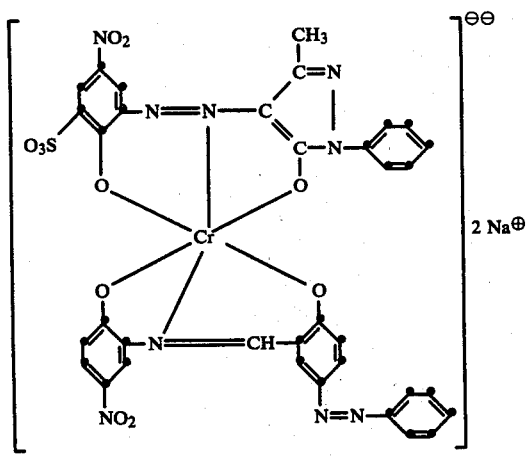

The 1:1-chrome complex containing 43.4 parts of the dye formed from diazotised 4-nitro-2-aminophenol-6-sulfonic acid and 1-(4'-methylphenyl)-3-methyl-5-pyrazolone as well as 5.2 parts of chromium is introduced into 250 parts of water and 250 parts of triethanolamine, and 15.4 parts of 4-nitro-2-aminophenol and 22.6 parts of the monoazo dye formed from diazotised aniline and salicylaldehyde are added. The reaction mixture is held, with stirring, at pH 7.5-8 and at 80° C. until the formation of the 1:2-complex dye is complete. The reaction mixture is then neutralised with hydrochloric acid; it is subsequently filtered, and the dye is rinsed with 750 parts of 25% sodium chloride solution and dried. It dyes wool, polyamide and leather in an orange shade having good fastness properties.

EXAMPLE 3

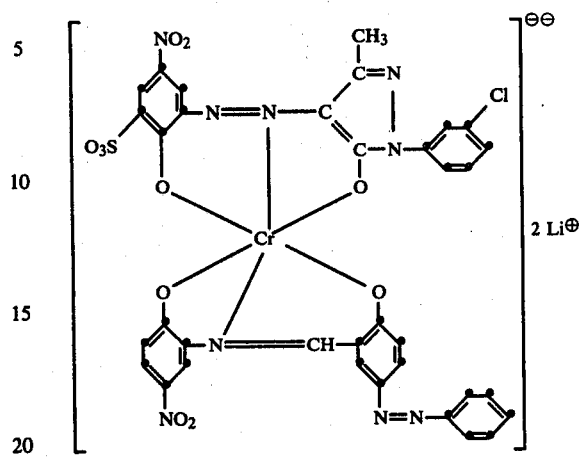

The solution of the 1:1-chrome complex which has been produced in 250 parts of n-butanol by a known method and which contains 45.4 parts of the dye formed from diazotised 4-nitro-2-aminophenol-6-sulfonic acid and 1-(3'-chlorophenyl)-3-methyl-5-pyrazolone as well as 5.2 parts of chromium is diluted with 500 parts of water, and to the solution are added at pH 7-8, with stirring, 15.4 parts of 4-nitro-2-aminophenol and 22.6 parts of the monoazo dye formed from diazotised aniline and salicylaldehyde. n-Butanol is azeotropically distilled off, and stirring is continued at 80° until the formation of the 1:2-complex dye is complete. 30 parts of lithium chloride are added at room temperature; the mixture is filtered, and the dye is rinsed with 50 parts of n-butanol and then dried. It dyes wool, polyamide and leather in an orange shade having good fastness properties.

Dyes having similar properties are obtained by reacting, in an analogous manner, the 1:1-chrome complex of the azo dye shown in Column 1 with the aminophenol given in Column 2 and the azo dye listed in Column 3. 1:2-Chrome complexes which dye wool and polyamide in orange shades having good fastness properties are obtained.

TABLE

| No. | 1. | 2. | 3. |
|---|---|---|---|
| 1. | (structure with HO₃S, OH, NO₂, N=N, pyrazolone with CH₃, C=N, Cl-phenyl) | (structure with OH, NH₂, NO₂) | (structure with OH, CHO, N=N-phenyl) |

TABLE-continued

| No. | 1. | 2. | 3. |
|---|---|---|---|
| 2. | 3-sulfo-5-nitro-2-hydroxyphenyl azo coupled to 1-phenyl-3-methyl-5-hydroxy pyrazole | " | " |
| 3. | " | " | 2-hydroxy-5-(2-chlorophenylazo)benzaldehyde |
| 4. | " | " | 2-hydroxy-5-(4-chlorophenylazo)benzaldehyde |
| 5. | " | " | 2-hydroxy-5-(2-methoxyphenylazo)benzaldehyde |
| 6. | " | " | 2-hydroxy-5-(4-methoxyphenylazo)benzaldehyde |
| 7. | " | " | 2-hydroxy-5-(4-methylphenylazo)benzaldehyde |

TABLE-continued

| No. | 1. | 2. | 3. |
|---|---|---|---|
| 8. | " | " | (2-hydroxy-3-formyl-phenyl)azo-(2-methylphenyl) structure |
| 9. | 2-hydroxy-3-sulfo-5-nitrophenyl azo pyrazolone with 2,5-dichlorophenyl, CH₃ | " | (2-hydroxy-3-formyl-phenyl)azo-phenyl structure |
| 10. | 2-hydroxy-3-sulfo-5-nitrophenyl azo pyrazolone with phenyl, CH₃ | " | (2-hydroxy-3-formyl-phenyl)azo-(2-methoxy-5-methylphenyl) |
| 11. | " | " | (2-hydroxy-3-formyl-phenyl)azo-(2-chloro-5-methoxyphenyl) |
| 12. | 2-hydroxy-3-sulfo-5-nitrophenyl azo pyrazolone with 2-methylphenyl, CH₃ | " | (2-hydroxy-3-formyl-phenyl)azo-phenyl |

| No. | 1. | 2. | 3. |
|---|---|---|---|
| 13. | " | " | ![structure with OH, CHO, CH3, N=N] |
| 14. | ![structure HO3S, OH, NO2, N=N-C, OCH3, OH, CH3] | " | ![structure OH, CHO, N=N] |
| 15. | ![structure HO3S, OH, NO2, N=N-C, CH3, OCH3] | " | " |

Dyeing instruction for polyamide 100 parts of polyamide knitting yarn are introduced into a dyeing bath at 50° containing 4000 parts of water, 2 parts of the dye of Example 1, 4 parts of ammonium sulfate and 2 parts of a levelling agent. The liquor is brought to boiling in the course of 45 minutes, and held for a further 45 minutes at boiling temperature. The dyed material is then removed, thoroughly rinsed with cold water and dried. The result is an orange-coloured polyamide having good fastness properties.

Dyeing instruction for wool 100 parts of wool knitting yarn are introduced into a dyeing bath at 50° consisting of 4000 parts of water, 2 parts of the dye of the example 2 of the Table, 4 parts of 80% acetic acid and 2 parts of a levelling auxiliary. The liquor is brought to boiling in the course of 45 minutes, and held at boiling temperature for a further 45 minutes. The dyed material is then removed, thoroughly rinsed with cold water and dried. An orange-coloured wool having good fastness properties is obtained.

What is claimed is:

1. A chrome-complex dye of the formula (I)

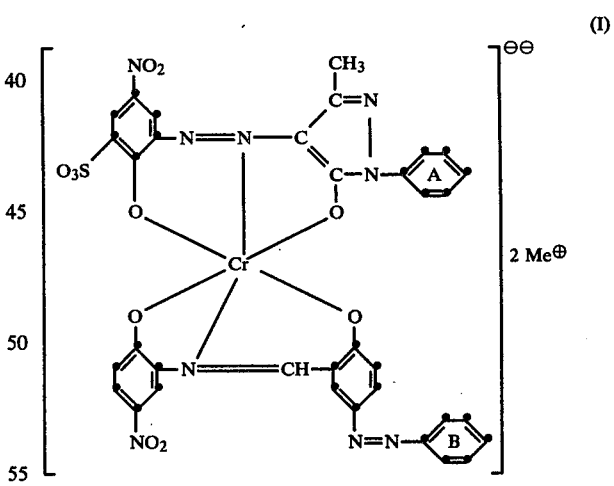

wherein the phenyl groups A and B independently of one another are each unsubstituted or are mono- or disubstituted by chlorine, methyl, ethyl, methoxy or ethoxy, and wherein Me⊕ is a cation.

2. A chrome-complex dye according to claim 1, wherein Me⊕ is a lithium or sodium cation.

3. A chrome-complex dye according to claim 1, wherein the phenyl groups A and B together carry no more than two of the substituents mentioned.

4. A chrome-complex dye according to claim 3 of the formula

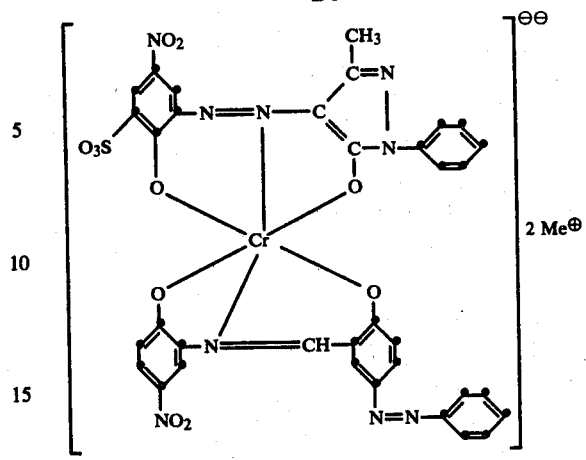
wherein Me⊕ is a cation.
* * * * *